United States Patent [19]

Bibbee et al.

[11] 4,223,213
[45] Sep. 16, 1980

[54] APPARATUS FOR RAPID DATA VERIFICATION OF A PROGRAMMABLE TIMER

[75] Inventors: Jeffrey N. Bibbee, Mogadore, Ohio; Thomas W. Smith, Fort Myers Beach, Fla.

[73] Assignee: McNeil Akron, Inc., Akron, Ohio

[21] Appl. No.: 908,542

[22] Filed: May 22, 1978

[51] Int. Cl.$^2$ ............................................. G06M 3/02
[52] U.S. Cl. .............................. 235/92 T; 235/92 PE; 235/92 DE; 235/92 MS
[58] Field of Search ........... 235/92 T, 92 PE, 92 MS, 235/92 DE; 73/5, 6; 324/74, 75

[56] References Cited

U.S. PATENT DOCUMENTS

| 4,001,553 | 1/1977 | Troutman et al. | 235/92 MS |
| 4,093,997 | 6/1978 | Germer | 235/92 MS |
| 4,101,761 | 7/1978 | Merryman | 235/92 MS |

*Primary Examiner*—Joseph M. Thesz
*Attorney, Agent, or Firm*—Hamilton, Renner & Kenner

[57] ABSTRACT

The present apparatus is intended for use with a timer for controlling a process having an operating cycle including a plurality of sequential operational steps and for providing at least one preselectable output signal for each such step. The apparatus includes an activator for initiating the execution of a test cycle by the timer, and a test cycle step incrementor for selectively incrementing the timer so as to permit the rapid verification of both the operation of the timer and the accuracy of the output signal for each step.

7 Claims, 3 Drawing Figures

APPARATUS FOR RAPID DATA VERIFICATION OF A PROGRAMMABLE TIMER

BACKGROUND OF THE INVENTION

This invention relates to an apparatus for use with a timer providing a plurality of presettable output signals for controlling a process having a plurality of sequential operational steps of presettable variable duration. More particularly, this invention relates to an apparatus for rapid and economical verification that the variable duration of each sequential operational step controlled by a timer, and the output signals provided by the timer for each such step, are as preset into the timer.

Timers are well known devices for controlling the sequence and duration of the operational steps in enumerable processes. When utilized with manufacturing processes, such as the vulcanization of a pneumatic tire, precise control of these steps is quite important not only to the quality of the finished product but also for efficient use of the tire presses used to effect such vulcanization.

Heretofore, timers utilized in the rubber process industry have been primarily mechanical in nature and therefore have been incapable of extremely precise control as well as adversely susceptible to numerous deleterious environmental factors, such as vibration. As exemplified by U.S. Pat. No. 4,022,555 entitled "Tire Cure Programmer and Function Generator" invented by Thomas W. Smith, timing devices substantially electronic in nature and capable of great precision and versatility have been previously disclosed. While highly useful, such devices still suffer deficiencies in that verification of the duration and output signal provided by the timer for each operational step is possible only by actually performing a complete tire cure cycle. This requires the expenditure of unnecessarily large amounts of operator and manufacturing time. However, such verification is mandatory because if the output signals for each operational step and/or duration of each operational step is not as desired, regardless of whether such improper operation is due to operator programming errors or equipment malfunction, an improper cure may result, thereby necessitating the disposal of all such defective tires.

SUMMARY OF THE INVENTION

Accordingly, it is an object of the present invention to provide an apparatus for use with a timer for controlling a process having an operating cycle including a plurality of sequential operational steps of presettable variable duration and providing a plurality of presettable output signals, the apparatus permitting the rapid and economical verification that the variable duration of each sequential operational step controlled by the timer and that the output signals provided by the timer for each such step are as preset into the timer.

It is another object of the present invention to provide an apparatus, as above, which, in verifying such step duration and output signals, is capable of exercising non-testing circuitry as if such circuitry was operating in a nontesting mode.

These and other objects and advantages of the present invention over existing prior art forms will become more apparent and fully understood from the following description in conjunction with the accompanying drawings.

In general, an apparatus embodying the concept of the present invention is intended for use with a timer for controlling a process having an operating cycle including a plurality of sequential operational steps and for providing at least one preselectable output signal for each such step. The apparatus includes means for activating the execution of a test cycle by the timer, and means for selectively incrementing the timer so as to permit the rapid verification of both the operation of the timer and the accuracy of the output signal for each step.

DESCRIPTION OF A PREFERRED EMBODIMENT

Figure 1:
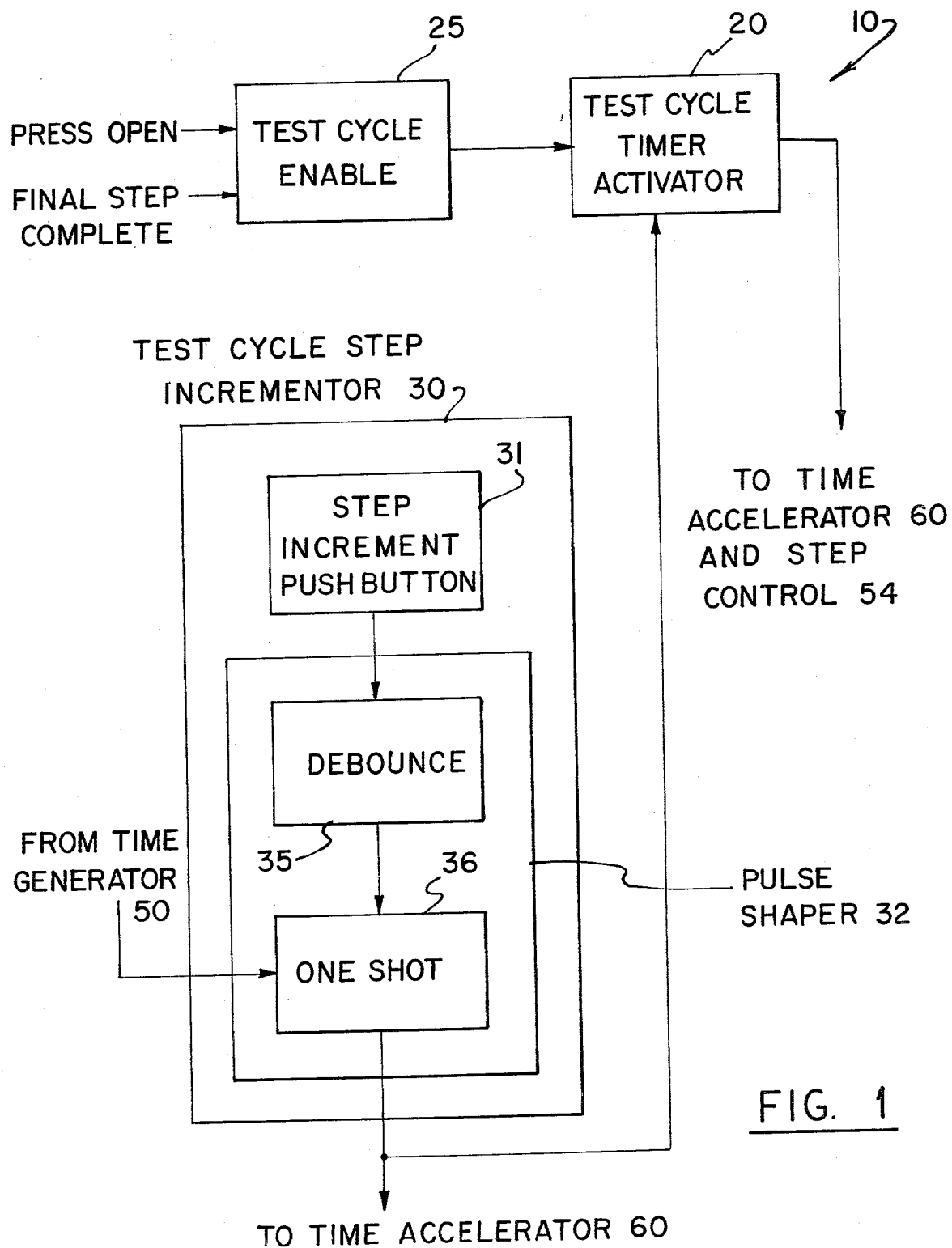
FIG. 1 is a block diagram of an exemplary apparatus according to the concept of the present invention.
Figure 3:
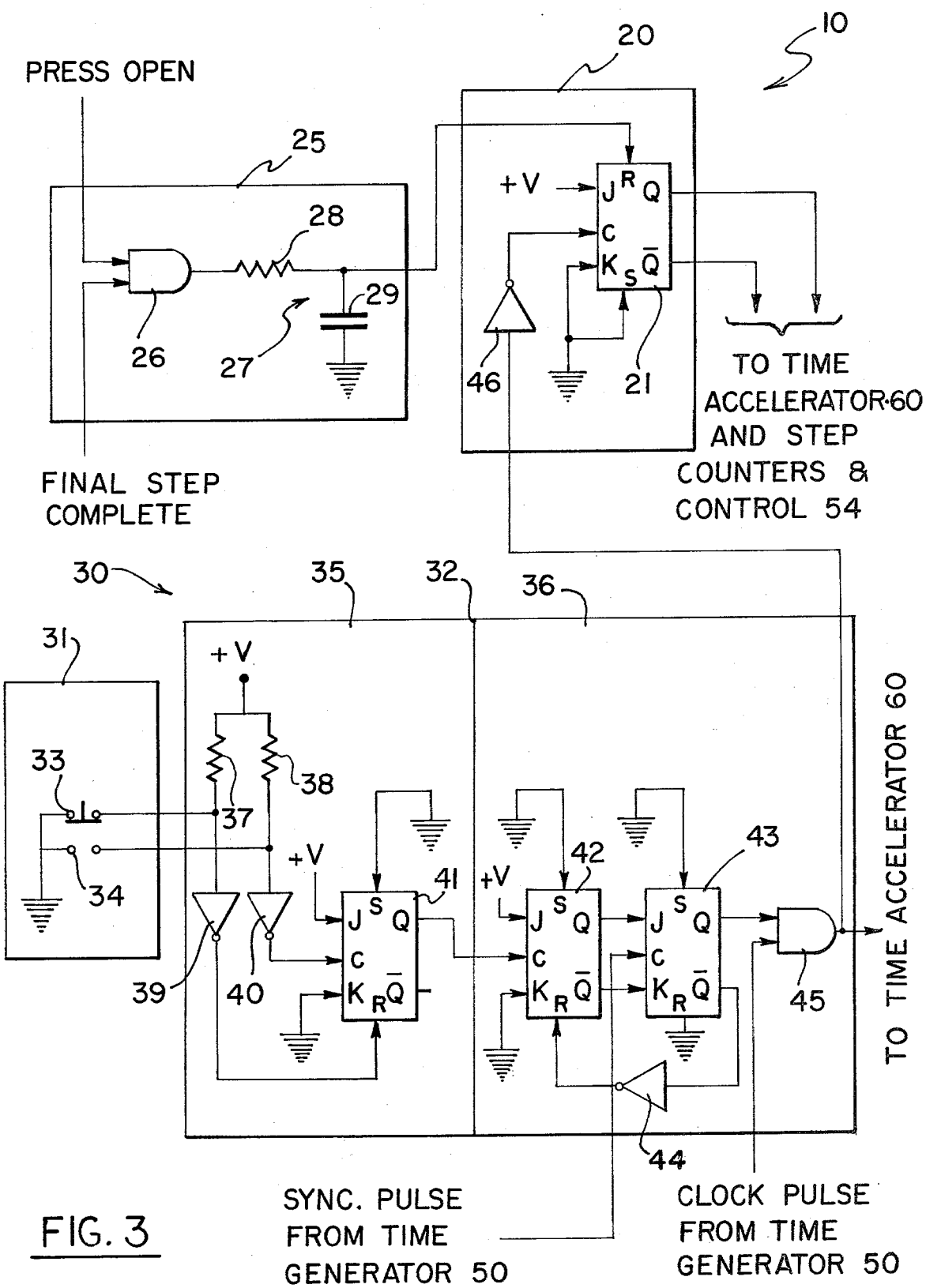
FIG. 3 is a schematic diagram of the apparatus depicted in FIG. 1.

FIGS. 1 and 3 depict, in block and schematic form, respectively, an apparatus according to the concept of the present invention, generally indicated by the numeral 10. Apparatus 10 includes in broad terms an activator 20, an enable 25, and step incrementor 30. Activator 20 includes a conventional J-K flip-flop 21 with set and reset features for initiating a test cycle in the timer. Enable 25 insures that a test cycle may not begin until the simultaneous occurrence of conditions noted hereinbelow. Step incrementor 30 is utilized to increment the timer when it is in the test cycle mode.

Regardless of the timer with which apparatus 10 is utilized, in many applications it may be desirable to inhibit activator 20 at all but certain times. Merely by way of example, and not limitation, apparatus 10 has been depicted herein as being utilized with a timer for controlling the process of vulcanization of a pneumatic tire. In such instance it is desirable to insure that, among other things, a test cycle is not begun until the final step of any normal operating cycle is complete and the tire press is open. Accordingly, signals indicative of these two conditions are provided by any suitable manner (not relevent herein) to enable 25 and received by AND gate 26, whose output is filtered by R-C network 27, including resistor 28 and capacitor 29, such that the output is suitable for receipt by the reset input to J-K flip-flop 21. By properly selecting the logic level of the enable 25 output signal in the absence of all conditions precedent, J-K flip-flop 21 is maintained in a reset condition and a test cycle cannot begin until the desired conditions are simultaneously met.

The J-K flip-flop 21 included in test cycle activator 20 has its J input connected to a voltage source of suitable voltage V to maintain it at a high logic level while both its K and set inputs are connected to ground. In this configuration the Q output remains at a low logic level until the first clock pulse occurring after J-K flip-flop 21 has been released from the reset condition.

As shown in FIG. 1, test cycle step incrementor 30 may be seen to include a conventional momentary contact push-button 31 and pulse shaper 32. Pulse shaper 32 includes debounce circuit 35 and monostable multivibrator 36 (known in the art as a one-shot). Push-button 31 has one normally closed and one normally open set of contacts 33 and 34, respectively, one side of both sets of which are connected to ground. In debounce circuit 35 the opposite side of the sets of contacts 33,34 are connected between pull-up resistors 37 and 38, respectively (both of which are in turn connected to voltage V), and logic inverters 39 and 40, respectively. The output signals from logic inverters 39 and 40 are received by the reset and clock inputs to J-K flip-flop 41, whose J input is connected to voltage V and whose K and set inputs are connected to ground.

With J-K flip-flop 41 in this configuration, the inputs to inverters 39 and 40 are normally kept at ground and approximately V potential, respectively, maintaining the clock and reset inputs to J-K flip-flop 41 at low and high logic levels, respectively. When the step increment pushbutton is depressed, contacts 33 are opened, releasing J-K flip-flop 41 from a reset condition, and contacts 34 are closed, enabling the J-K flip-flop 41 clock (which only responds to a low-to-high logic level transition) to increment and thereby abruptly change the output thereof from a low to high logic level. Upon release of pushbutton 31, contacts 34 are opened, returning J-K flip-flop 41 clock to a low logic level, and contacts 33 are closed forcing J-K flip-flop 41 to return to a reset condition and its Q output to abruptly return to a low logic level. In this manner a single, well-defined pulse is generated by J-K flip-flop 41 each time pushbutton 31 is operated.

The debounced output signal from J-K flip-flop 41 is received by the clock input to the first of two J-K flip-flops 42,43, which, together with reset logic inverter 44 and AND gate 45 dicussed hereinafter, form one-shot 36. The set and K inputs to J-K flip-flop 42 and the set and reset input to J-K flip-flop 43 are all connected to ground. The J input to flip-flop 42 is connected to voltage V. The Q and $\overline{Q}$ output signals from J-K flip-flop 42 are received by the J and K inputs to J-K flip-flop 43, respectively. The $\overline{Q}$ output signal from J-K flip-flop 43 is inverted by logic inverter 44, the output of which is received by the reset input to J-K flip-flop 42.

One-shot 36 receives the asynchronous pulse from debounce circuit 35 and generates a single pulse synchronized in time with the timer's time generator, to be hereinafter discussed. Specifically, when the leading edge of a pulse from debounce circuit 35 is received, the clock of J-K flip-flop 42 is incremented and the Q output of J-K flip-flop 42 goes to a high logic level, which may be referred to as a "set" state. The clock input of J-K flip-flop 43 is connected to the timer's time generator such that only upon the receipt of the next sync pulse from the time generator after J-K flip-flop 42 has been "set" will the Q output of J-K flip-flop 43 go to a high logic level. Of course, at the same time the $\overline{Q}$ output of J-K flip-flop 43 goes to a low logic level, thereby resetting J-K flip-flop 42. Upon the occurrence of the second sync pulse from the time generator after J-K flip-flop 42 has been "set," the clock of J-K flip-flop 43 is again incremented causing its Q output to once again return to a low logic level, completing a shaped one-shot 36 "pulse" output signal. Thereafter, J-K flip-flops 42 and 43 again await the next pulse from debounce circuit 35.

In order to synchronize the rapid incrementation of the timer as explained further hereinafter, the Q output from J-K flip-flop 43 is received by AND gate 45 along with a clock pulse train from the timer time generator. The output of AND gate 45 is received by the timer as noted below and is also inverted by logic inverter 46 and connected to the J-K flip-flop 21 clock input.

Apparatus 10 is suitable for use with a broad spectrum of timers utilized for controlling a process having an operating cycle incorporating a plurality of sequential operational steps, and for providing at least one preselectable output signal for each step. As previously noted, the apparatus is illustrated herein in conjunction with a timer controlling the process for vulcanization of a pneumatic tire. One such suitable timer is disclosed in Smith U.S. Pat. No. 4,022,555 noted hereinabove, to which reference is made for whatever details may be necessary to more fully understand the present invention. Insofar as necessary for an explanation of the present invention, certain components illustrated in FIG. 1 of the Smith patent have been reproduced in FIG. 2 herein.

Figure 2:
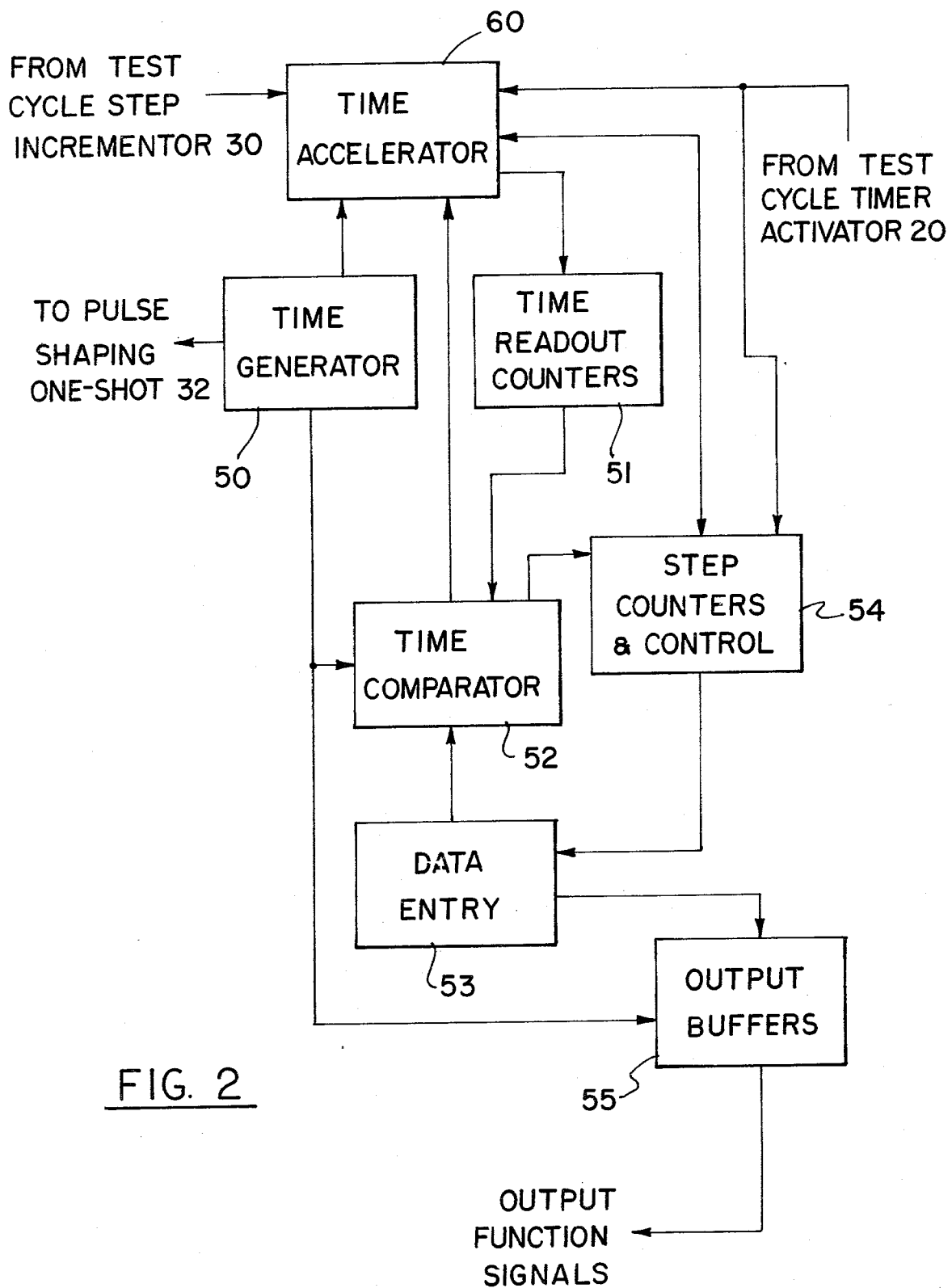
FIG. 2 is a block diagram of an exemplary timer with which the apparatus depicted in FIG. 1 is suitable for use.

Referring now to FIG. 2, time generator 50 generates synchronization and clock pulses as required, and drives time readout counters 51. The desired number of steps, time in each step, and output signals for each step are programmed into data entry 53 by any suitable means, not relevant herein. Step counters and control 54 continually monitors the present step, causes the appropriate data programmed into data entry 53 to be read, decoded (if necessary) and received by time comparator 52, causes the appropriate data programmed into data entry 53 to be received by output buffers 55, and provides signals for resetting the step counters. Time comparator 52 compares the actual time in a particular step as indicated by the time readout counters 51 with the preselected time-in-step data from data entry 53.

When apparatus 10 is utilized with the above timer, the clock pulses from time generator 50 pass through time accelerator 60 before being received by time readout counters 51. Time accelerator 60 has a plurality of various inputs and outputs, the purpose and relations of which will be explained hereinbelow. The electronic components and circuitry comprising accelerator 60 are conventional items which may be readily assembled by one possessing ordinary skill in logic devices once he understands the functions to be performed thereby. Moreover, it should be appreciated that there are numerous logic circuits which will perform adequately and may be employed herein.

The clock pulses from time generator 50 include two pulse trains of different frequencies, the first representative of real time, and the second of a much higher frequency (for example, 30 Hz) suitable for rapidly incrementing the time readout counters 51. Time accelerator 60 also receives the output signal from AND gate 45 in one-shot 36, the Q output signal from J-K flip-flop 21 in test cycle timer activator 20, and an output signal from step counters and control 54 indicative of the end of each step. In the absence of an output signal from test cycle timer activator 20, the real time clock pulses from time generator 50 are passed to the readout counters 51, and time readout counters 51 are incremented by time generator 50 in the manner provided in the Smith patent.

However, in the presence of an output signal from test cycle timer activator 20, receipt of a pulse from one-shot 36 results in the resetting of time readout counters 51 to zero and the advancement of step counters and control 54 to the next step. Thereafter, the data for this next step is then read by the time comparator 52, as in the Smith patent, and time accelerator 60 gates the high frequency pulse train to time readout counters 51. Upon coincidence of all the digits of time readout counter 51 with the data entered for that step and digit, time comparator 52 generates a time match pulse and discontinues receipt of clock pulses by time readout counters 51.

It should now be appreciated that each time step increment pushbutton 31 is activated, time readout counters 51 are cleared and preset with the preselected time for the next sequential step. Additionally, because the timer has merely been rapidly advanced to the conclusion of each step, the timer should simultaneously provide the desired preselected output signals, all timing circuits other than time accelerator 60 having been exercised in their normal manner of operation. At this point the operator may then visually compare the time in each step and its outputs (the status of which may be indicated by light emitting diodes or any other suitable means) with those preselected. Of course, such comparison could, alternately or additionally be performed by an automated device. If a discrepency occurs, normal checking and corrective procedures can be initiated and no improper tire cure has resulted.

Because the timer will not increment while in a test cycle mode until a signal is provided by step incrementor 30, time and/or output data corrections may be directly made at this time into data entry 53 for the next step. Of course if such a change is made, time comparator 52 will no longer provide a match signal to time accelerator 60, and time readout counters 51 will immediately begin to receive the high frequency pulse train until a new match occurs. In this manner, while the apparatus 10 has preset the timer to the preselected data for the present step, an operator or controlling device may make and immediately verify data changes in the present step before advancing to the next step.

After positive verification, the operator at his convenience merely again activates the step increment pushbutton 31 and the next step is entered and rapidly preset for verification. This process of verification is continued until all preselected steps have been completed, whereupon the timer is automatically ready to enter either another test cycle or a normal operating cycle.

It should be emphasized that many of the component circuits employed herein are merely exemplary of numerous circuits known for performing the desired function and, as such, fall well within the scope of the present invention.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that an apparatus constructed according to the concept of the present invention, and reasonably equivalent thereto, will accomplish the objects of the present invention and otherwise substantially improve the art of rapidly verifying both the preselected data programmed into a timer for controlling a process having a plurality of sequential operational steps and the timer's operation.

We claim:

1. Test apparatus for use with a timer for controlling a process having an operating cycle incorporating a plurality of sequential operational steps and for providing at least one preselectable output signal for each such step, comprising:

means for activating the execution of a test cycle by the timer at a time other than during the process operating cycle and providing a pulse output signal to the timer;

means for selective single step incrementing of the timer through the plurality of sequential operational steps; and, means for rapid verification of the operation of the timer and of each preselected output signal for each operational step, said means for selective single step incrementing of the timer inhibiting until after said means for rapid verification has verified the operation of the timer and of each preselected output signal for the prior operational step.

2. Test apparatus, as in claim 1, further including means for enabling said means for activating, said means for enabling inhibiting the execution of a test cycle during an operating cycle.

3. Test apparatus, as in claim 2, wherein said means for selective single step incrementing of the timer includes means for initiating a step increment providing a pulse output signal and means for shaping said pulse output signal to provide a shaped pulse output signal.

4. Test apparatus for use with a timer for controlling a process having an operating cycle incorporating a plurality of sequential operational steps and for providing at least one preselectable output signal for each such step, comprising:

means for activating the execution of a test cycle by the timer at a time other than during the process operating cycle and providing a pulse output signal to the timer;

means for enabling said means for activating, said means for enabling inhibiting the execution of a test cycle during an operating cycle:

means for selective single step incrementing of the timer through the plurality of sequential operational steps, said means for selective single step incrementing of the timer including manually operable means for initiating a step increment providing a pulse output signal and means for shaping said pulse output signal to provide a shaped pulse output signal; and, means for rapid verification of the operation of the timer and of each preselected output signal for each operational step.

5. Test apparatus, as in claim 3 or 4, wherein said means for shaping said pulse output signal includes debounce circuit means and monostable multivibrator means.

6. Test apparatus, as in claim 5, wherein the timer includes means for counting time, and generator means for providing clock pulse signals to said time counting means of at least two frequencies, a first frequency representative of real time and a second accelerated frequency, said time counting means receiving said first frequency during said operating cycle, said means for activating the execution of a test cycle providing an activation pulse output signal which, when received by the timer, permits the selective reception of said second accelerated frequency by said time counting means.

7. Test apparatus for use with a timer for controlling a process having an operating cycle incorporating a plurality of sequential operational steps and for providing at least one preselectable output signal for each such step, comprising:

means for activating the execution of a test cycle by the timer providing a pulse output signal to the timer;

means for enabling said means for activating, said means for enabling inhibiting the execution of a test cycle during an operating cycle;

means for selectively incrementing the timer including means for initiating a step increment providing a pulse output signal and means for shaping said pulse output signal to provide a shaped pulse output signal, thereby permitting the rapid verification of the operation of the timer and of each preselected output signal for each operational step, said means for shaping said pulse output signal including debounce circuit means and monostable multivibrator means; and the timer including means for counting time, and generator means for providing clock pulse signals to said time counting means of at least two frequencies, a first frequency representative of real time and a second accelerated frequency, said time counting means receiving said first frequency during said operating cycle, said time counting means selectively receiving said second accelerated frequency upon the receipt of said pulse output signal by the timer, and wherein upon receipt of both said pulse output signal from said means for activating and said shaped pulse output signal by the timer, said means for counting time is reset and thereafter the timer is preset with the preselectable output signal for the next step, permitting modification of said preselectable output signal and substantially immediate verification thereof.

* * * * *